United States Patent [19]

Kaes et al.

[11] Patent Number: 4,922,966
[45] Date of Patent: May 8, 1990

[54] ELECTRICALLY CONTROLLABLE 3-WAY VALVE

[75] Inventors: Guenter Kaes, Stuttgart; Alwin Stegmaier, Schwieberdingen, both of Fed. Rep. of Germany

[73] Assignee: Robert Bosch GmbH, Stuttgart, Fed. Rep. of Germany

[21] Appl. No.: 310,143

[22] Filed: Feb. 14, 1989

[30] Foreign Application Priority Data

Mar. 23, 1988 [DE] Fed. Rep. of Germany ....... 3809742

[51] Int. Cl.$^5$ ............................................ F15B 13/044
[52] U.S. Cl. .......................... 137/627.5; 137/596.17; 251/129.19; 251/129.21
[58] Field of Search ...................... 137/596.17, 627.5; 251/129.18, 129.19, 129.21

[56] References Cited

U.S. PATENT DOCUMENTS

| | | | |
|---|---|---|---|
| 3,989,063 | 11/1976 | Brouwers et al. | 137/596.17 |
| 4,529,166 | 7/1985 | Klausen et al. | 251/129.21 X |
| 4,534,382 | 8/1985 | Tanguy | 137/596.17 X |
| 4,640,558 | 2/1987 | Nomura et al. | 137/596.17 X |

Primary Examiner—Gerald A. Michalsky
Attorney, Agent, or Firm—Edwin E. Greigg

[57] ABSTRACT

A known valve controllable by means of an electromagnet includes at least one spring installed with prestressing, the prestressing of which must be within a relatively narrow tolerance range, if the valve is to function properly. Since then, when the valve has been assembled, the spring, which is subject to manufacturing tolerances, and other components subject to manufacturing tolerances, have been replaced with other components of different dimensions until a suitable prestressing was arrived at. The invention seeks to avoid this replacement work. The problem is solved by disposing an element that is displaceably installed so as to overcome frictional forces, and one end of a spring is supported on this element. One or more such elements are advantageously usable in multi-position magnetic valves, which for instance belong to vehicle brake systems and in particular to their anti-skid systems.

17 Claims, 2 Drawing Sheets

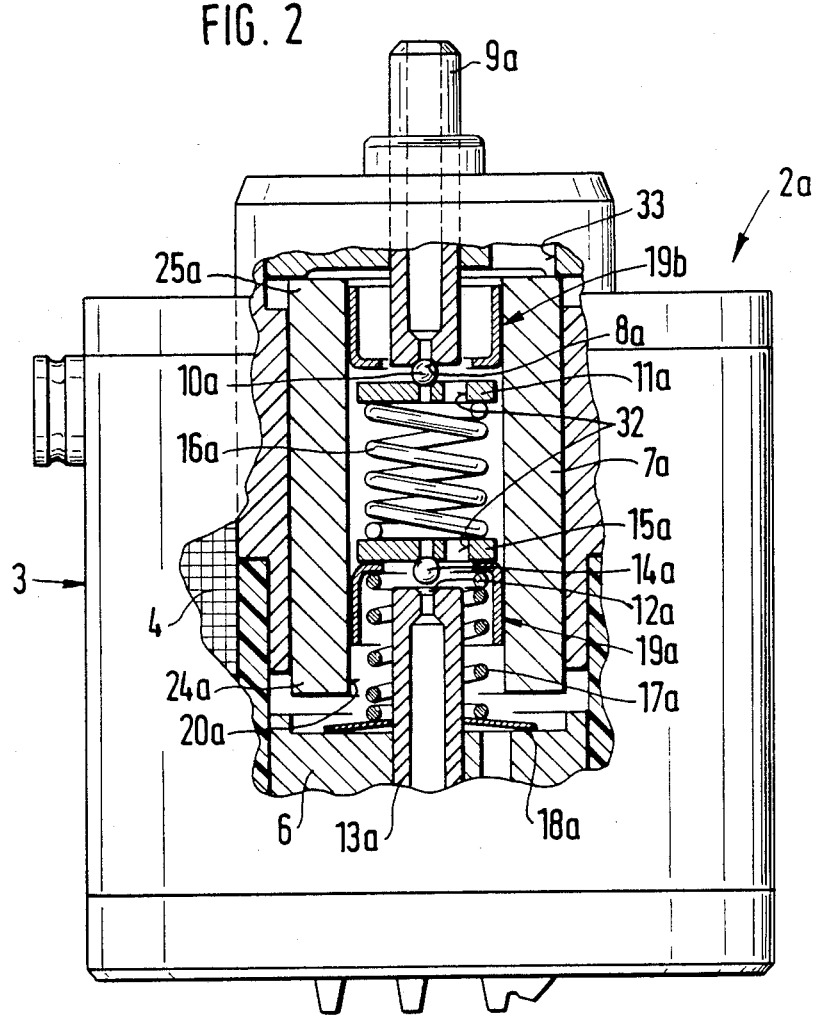

ELECTRICALLY CONTROLLABLE 3-WAY VALVE

BACKGROUND OF THE INVENTION

The invention is based on an electrically controlled 3-way valve as generically defined herein. A 3-way valve known from U.S. Pat. No. 3,989,063 has an armature, drilled out to form steps inside it, into which stop rings and spacer rings are placed in succession and fixed by bracing. Two closure member holders are located displaceably inside the spacer rings between the stop rings. The mobility of the closure member holders in the axial direction of the armature is limited by the stop rings. Both the valve closing spring located between the closure member holders and the anchor restoring spring are installed with prestressing. At given armature forces for a middle and a final armature position, the forces of the prestressed springs must be at a suitable ratio to one another and to the magnetic forces. Because of unavoidable manufacturing tolerances, the ratio of the spring forces often deviates disadvantageously from the most favorable value. In such cases, a suitable ratio of the forces of the prestressed springs is finally established by replacing the aforementioned rings with others of different heights. Replacing the rings is very time-consuming and therefore has the disadvantage of making the valve more expensive.

OBJECT AND SUMMARY OF THE INVENTION

The valve according to the invention has an advantage over the prior art that the adjustment of a favorable spring prestressing can be performed by displacing the stressed element. The displacement of the element can for example be performed by means of a manually actuatable spindle press.

The characteristics set forth have an advantage that the element can be accommodated inside the armature in a space-saving manner, so that the armature has a favorable cross section for generating sufficiently great forces.

Other characteristics have an advantage that the element, which represents a stop shoulder for a closure member holder, can be made from a thin-walled tube and therefore occupies particularly little space.

Still other characteristics define an alternative exemplary embodiment, which is likewise embodied in a great space-saving way and can be produced inexpensively. With other characteristics, the element intended for adjusting the spring prestressing is further developed to make a centering means for one end of a spring to be installed.

Yet other characteristics define an exemplary embodiment that on the one hand can be produced in a favorable manner and on the other assures a desired exact alignment of the stop shoulder inside the armature.

Other characteristics provide a 3/3-way valve. The further feature defined provides an economical embodiment using two tubular elements having the same rated diameter.

The invention will be better understood and further objects and advantages thereof will become more apparent from the ensuing detailed description of two preferred embodiments taken in conjunction with the drawings.

BRIEF DESCRIPTION OF THE DRAWINGS

FIG. 2 shows a second exemplary embodiment of the valve according to the invention, again in longitudinal section.

DESCRIPTION OF THE PREFERRED EMBODIMENTS

Figure 1:
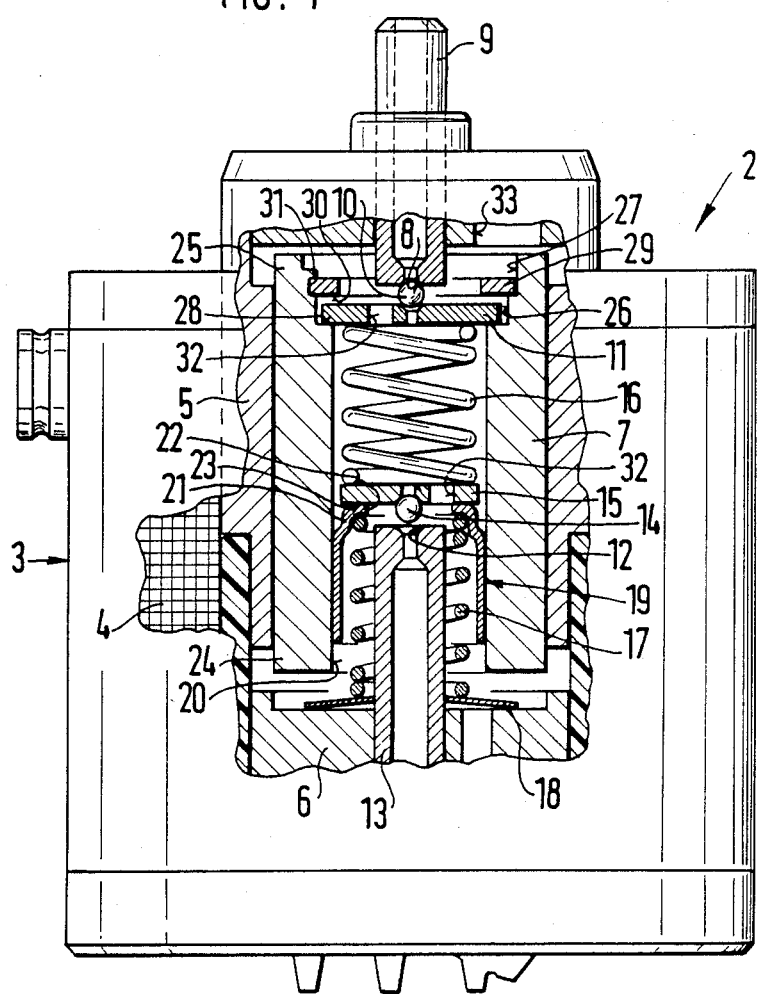
FIG. 1 shows a first exemplary embodiment of the invention in longitudinal section.

The valve 2 according to the invention and shown in FIG. 1 has an electromagnet 3 with a coil 4, a magnetic short circuit 5 and a pole piece 6, an armature 7, a first valve seat 8 having a connecting tube 9 for fluid flow, a first closure member 10, a first closure member holder 11, a second valve seat 12 having a connecting tube 13 for fluid flow, a second closure member 14, a closure member holder 15, a valve closing spring 16, a first armature restoring spring 17 and a second armature restoring spring 18, as well as an element 19 disposed in the armature 7. Element 19 is provided for adjustment of the spring forces which will be described later.

The electromagnet 3, its coil 4, the magnetic short circuit 5 and the pole piece 6 are embodied in the manner known from the prior art. An example can be found in U.S. Pat. No. 3,989,063.

In the vicinity of the second valve seat 12, the armature 7 has a cylindrical bore 20 for receiving the element 19. This element 19 is preferably embodied in the manner of a thin-walled tube and at one end has a restriction 21 and a rim 22 facing radially inward. The rim 22 serves as a stop shoulder 23 for the second closure member holder 15. The second connecting tube 13 begins at the pole piece 6 and protrudes into the armature 7 and into the inside of the element 19. The second armature restoring spring 18 is embodied in the manner of a plate spring, it surrounds the second connecting tube 13, and rests on the pole piece 6. The lower end 24 of the armature 7 is oriented toward the second armature restoring spring 18. The first armature restoring spring 17 is inserted between this second armature restoring spring 18 and the rim 22, and the restriction 21 serves to center the first armature restoring spring 17.

On its upper end 25, the armature 7 has bore steps 26 and 27 of different radii. The lower bore step 26 forms a stop shoulder 28 for the first closure member holder 11. A stop ring 29 is inserted into the stepped bore 27 and forms an additional stop shoulder 30 oriented toward the first closure member holder 11. Inside the stepped bore 27, the stop ring 29 is secured by means of bracing means 31. The stop shoulders 28 and 30 are spaced apart by a distance such that the first closure member holder 11 is axially movable to some extent in the axial direction of the armature 7. The valve closing spring 16 that is installed with prestressing is located between the first closure member holder 11 and the second closure member holder 15. The valve closing spring 16 urges the second closure member holder 15 toward the element 19. The closure members 10 and 14 are preferably embodied in the form of balls, which facing valve closing spring 16 are connected firmly to the respective closure member holder 11 or 15. The closure members 10 and 14 are aligned with the valve seats 8 and 12. Both the first closure member holder 11 and the second closure member holder 15 are disposed such that they are radially movable to a sufficient extent inside the armature 7 so that an exact alignment of the closure members 10 and 14 with their respective valve seats 8 and 12 is possible for the sake of good sealing. By the disposition of apertures 32, a flow through the closure member holders 11 and 15 in the longitudinal direction of the armature 7 is possible.

The valve 2 according to the invention is shown in the current less state of the coil 4. As a result, the first armature restoring spring 17 and the second armature restoring spring 18, via the rim 22 and the element 19, displace the armature in the direction toward the first valve seat 8, until after the first closure member 10 has arrived at the first valve seat 8 the valve closing spring 16 is compressed so far that the first closure member holder 15 rests on the stop shoulder 28 of the armature 7. As a result, the first connecting tube 9 is blocked off relative to the second connecting tube 13 and to a connecting opening 33 that is open toward the armature 7 and is open to a pressure container 34 which is connected to the valve.

If the coil 4 is excited with a first current intensity, forces of attraction develop between the pole piece 6 and the end 24 of the armature 7, increasing as the distance between the end 24 and the pole piece 6 decreases. These forces cause a displacement of the armature 7 in the direction of the pole piece 6, and both the first armature restoring spring 17 and the second armature restoring spring 18 are compressed somewhat beyond the extent of their original prestressing. The valve closing spring 16, because it is supported via the first closure member holder 11 and the first closure member 10 on the first valve seat 8, acts in the direction of the forces of attraction exerted by the pole piece 6 upon the armature 7. This causes displacement of the armature 7 until such time as the closure member 14 meets the valve seat 12 and closes it. From that moment on, the valve closing spring 16 acts as a so called barrier spring, with the consequence that the armature 7 comes to a stop and the valve seats 8 and 12 are closed. Accordingly, a flow of pressure fluid cannot develop either between the first valve seat 8 and the connecting opening 33 or between the second valve seat 12 and the connecting opening 33.

If the coil 4 is excited with a second current intensity that is greater than the first, the armature 7 moves the first closure member holder 11, together with the first closure member 10, away from the first valve seat 8, via the stop 29. As a result, a flow connection is established, as desired, between the first valve seat 8 and the connecting opening 33 to the pressure container 34.

As can be readily inferred from the description, the springs 16, 17 and 18 must be correctly adapted to one another in both their stiffness and their prestressing, after they are installed in the valve 2 according to the invention. However, since the spring stiffness deviates within tolerance limits because of manufacturing circumstances, and because the dimensions of the springs 16, 17 and 18 to be measured in the axial direction also are subject to tolerances while they are not yet installed, care must be taken that in the compressions of the springs associated with the above-described positions of the valve closure members 10 and 14, a favorable ratio of the force of the spring 16 to that of the springs 17 and 18 prevails. The disposition of the aforementioned element 19, which is located in the cylindrical bore 20 will now be set forth. In the as yet uninstalled state, the element 19 has an outer diameter that is greater than the inside diameter of the cylindrical bore 20. When the element 19 is introduced into the cylindrical bore 20, its outside diameter decreases, which produces pressure forces and accordingly frictional forces between the element 19 and the cylindrical bore 20 that counteract a displacement of the element 19 inside the cylindrical bore 20. The dimensions of the element 19 are selected such that even though the element 19 can be displaced in the longitudinal direction of the cylindrical bore 20 when it is installed, displacement of the element 19 from the stress of the springs 16, 17 and 18 and from vibration caused by the motion of the armature 7 is precluded. It will be readily appreciated that by displacing the element 19 in the direction toward the stop ring 29, the valve closing spring 16 can be prestressed to a progressively greater extent, and that on the other hand, at a given length of the first armature restoring spring 17, its prestressing will be correspondingly less. As a result, the element 19 and the armature 7, with its cylindrical bore 20, forms an infinitely adjustable device for adjusting the prestressing of springs and thereby for adapting the prestressing to a ratio that assures malfunction-free operation of the valve 2 according to the invention at two different excitement stages of the coil 4. The device is especially economical, because the existing friction lock between the element 19 and the cylindrical bore 20 makes additional securing elements unnecessary. The device also has the advantage that because elements having extended smooth surfaces are used, the installation process does not produce chips that would contaminate the pressure fluid to be controlled and damage components acted upon by the pressure fluid.

The tubular element 19 can for instance be produced by chip-producing machining of a relatively thick-walled tube. To reduce the cost, however, it is more practical to generate a stop shoulder 23, for example, by crimping of a thin-walled length of tubing. The restriction 21 can then also be made by narrowing the tube. If the height of the element 19 is selected as only half as great as its diameter, it is more advantageous to make the element 19 by deep drawing. A conicity produced in deep drawing can then advantageously be utilized for introducing the element 19 into the cylindrical bore 20.

The second exemplary embodiment of the valve 2a shown in FIG. 2 differs from the first primarily in having a different kind of armature 7a. This armature 7a is cylindrical over its entire length, so that a cylindrical bore 20a extends continuously between its ends 24a and 25a. There is room, with radial play, inside the cylindrical bore 20a for a first closure member holder 11a and a second closure member holder 15a. A valve closing spring 16a is again installed between the closure member holders 11a and 15a. Armature restoring springs 17a and 18a are again provided. An element 19a corresponding to the element 19 of the first embodiment is embodied simply, because the restriction 21 of the first embodiment has been omitted. To replace the stop ring 29 and stop shoulder 30 of the first exemplary embodiment, a second element 19b is installed in the armature 7a; this second element may have the same dimensions as the element 19a. Closure members 10a and 14a, to which valve seats 8a and 12a belong, are again associated with the closure member holders 11a and 15a.

As is readily apparent from a comparison of FIGS. 1 and 2, the exemplary embodiment of FIG. 2 is less expensive to produce. By disposing the second element 19b in the vicinity of the first closure member holder 11a, an additional adjustment option for the prestressing of at least one spring is attained; that is, the armature restoring spring 17 can now be adjusted with the element 19a, and the valve closing spring 16a can additionally be adjusted with the element 19b.

The concept of the invention has been described above in terms of two so-called 3/3-way valves 2 and 2a, which in their middle positions disconnect all three of their connections. Naturally the invention is also applicable to valves embodied differently from the exemplary embodiments shown. For instance, the elements 19, 19a and 19b can logically also be used in valves having two or even four positions, in which it is even more important for the spring forces to be adapted to one another.

Instead of the elements 19, 19a and 19b of cylindrical circumference, other elements may naturally be used, which can be displaced inside a bore by overcoming friction locking. Such elements may for instance be slit rings or slit lengths of tubing. Even starshaped elements having friction faces aimed at the cylindrical bore 20 or 20a are possible.

The valve according to the invention is advantageously usable in vehicle brake systems and in their anti-skid systems. The valve according to the invention is also suitable for use in vehicle leveling devices and in clutch and transmission control systems.

It will be obvious to one skilled in the art that elements associated with the armature and not attracted thereby should be made nonmagnetic materials.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A valve having an electromagnet that controls an armature aligned in a longitudinal direction thereof, at least one valve seat aligned coaxially with the armature and an associated closutre member, a closure member holder firmly joined to said closure member, at least one prestressed valve closing spring, said closure member holder is movable in the longitudinal direction of the electromagnet by means of said armature and is loaded by said at least one prestressed valve closing spring, a cylindrical bore (20,20a) extending in a longitudinal direction of said armature (7,7a), at least one adjusting element adjustably displaceable within said armature that maintains the prestressing of said at least one prestressed valve closing spring, said at least one adjusting element including a substantially tubular main body portion and a radially inwardly oriented rim on one end of said substantially tubular main body portion which forms a stop shoulder (23) for said closure member holder, said inwardly oriented rim has a wall thickness substantially that of a wall thickness of said substantially tubular main body portion of said at least one adjusting element, and said at least one adjusting element (19,19a or 19b) is adjustably displaceable in said bore (20) by overcoming friction locking.

2. A valve as defined by claim 1, in which said at least one adjusting element (19, 19a or 19b) is embodied as a deep-drawn part.

3. A valve as defined by claim 2, in which in the vicinity of said stop shoulder, said at least one 4. A valve as defined by claim 3, in which a length of said at least one tubular element (19, 19a or 19b) is greater than one-half its diameter.

5. A valve as defined by claim 3, which includes first and second valve seats, first and second closure members, first and second closure member holders disposed in axial alignment, and said at least one prestressed valve closing spring (16 or 16a) is inserted between said first and second closure member holders.

6. A valve as defined by claim 5, in which said bore of said armature includes first and second adjacent steps (26, 27) near one end thereof, a stop (29) secured on said second step, said first closure member holder 11 is secured between said stop (29) and said first step, said at least one adjusting element is secured in a lower end of said armature, said at least one adjusting element includes a stop shoulder which forms a stop for said second closure member holder, and an opening in said valve that permits fluid flow from between said first and second valve seats to outside of said valve.

7. A valve as defined by claim 2, in which a length of said at least one tubular element (19, 19a or 19b) is greater than one-half its diameter.

8. A valve as defined by claim 1, in which in the vicinity of said stop shoulder, said at least one adjusting element (19) has a restriction (21) into which one end of a second spring (17) extends.

9. A valve as defined by claim 8, in which a length of said at least one tubular element (19, 19a or 19b) is greater than one-half its diameter.

10. A valve as defined by claim 8, which includes first and second valve seats, first and second closure members, first and second closure member holders disposed in axial alignment, and said at least one prestressed valve closing spring (16 or 16a) is inserted between said first and second closure member holders.

11. A valve as defined by claim 10, in which said bore of said armature includes first and second adjacent steps (26, 27) near one end thereof, a stop (29) secured on said second step, said first closure member holder 11 is secured between said stop (29) and said first step, said at least one adjusting element is secured in a lower end of said armature, said at least one adjusting element includes a stop shoulder which forms a stop for said second closure member holder, and an opening in said valve that permits fluid flow from between said first and second valve seats to outside of said valve.

12. A valve as defined by claim 1, in which a length of said at least one tubular element (19, 19a or 19b) is greater than one-half its diameter.

13. A valve as defined by claim 1, which includes first and second valve seats, first and second closure members, first and second closure member holders disposed in axial alignment, and said at least one prestressed valve closing spring (16 or 16a) is inserted between said first and second closure member holders.

14. A valve as defined by claim 13, in which said bore of said armature includes first and second adjacent steps (26, 27) near one end thereof, a stop (29) secured on said second step, said first closure member holder (11) is secured between said stop (29) and said first step, said at least one adjusting element is secured in a lower end of said armature, said at least one adjusting element includes a stop shoulder which forms a stop for said second closure member holder, and an opening in said valve that permits fluid flow from between said first and second valve seats to outside of said valve.

15. A valve as defined by claim 13, in which said cylindrical bore (20) of said armature extends over an entire length of said armature (7a), and includes first and second adjusting elements (19a, 19b) pressed into said bore of said armature (7a) in such a way that first and second closure member holders (11a, 15a) and said prestressed valve closing spring (16a) are located between said first and second adjusting element (19a, 19b).

16. A valve as defined in claim 13, in which said valve includes an inlet via said second valve seat, an outlet via said first valve seat and an opening to the outside of said valve for fluid flow to a pressure source.

17. A valve having an electromagnet that controls an armature aligned in a longitudinal direction thereof, at least one valve seat aligned coaxially with the armature and an associated closure member, a closure member holder firmly joined to said closure member, at least one prestressed valve closing spring, said closure member holder is movable in the longitudinal direction of the electromagnet by means of said armature and is loaded by said at least one prestressed valve closing spring, at least one substantially tubular adjusting element that maintains the prestressing of said at least one prestressed valve closing spring, a cylindrical bore (20 or 20a) extending in the longitudinal direction of said armature (7 or 7a), said cylindrical bore (20) of said armature extends over an entire length of said armature (7a), and includes first and second adjusting elements (19a, 19b) pressed into said bore of said armature (7a) in such a way that first and second closure member holders (11a, 15a) and said at least one prestressed valve closing spring (16a) are located between said first and second adjusting elements (19a, 19b), and said at least one adjusting element (19, 19a or 19b) is adjustably displaceable in said bore (20) by overcoming friction locking.

* * * * *